Aug. 6, 1957     F. UTZ     2,801,654
GUARD FOR MOTOR-DRIVEN HAND CIRCULAR SAW
Filed April 7, 1955
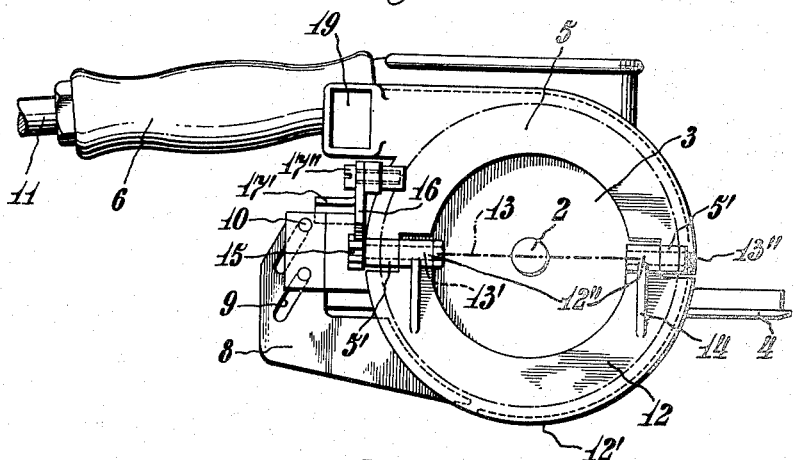
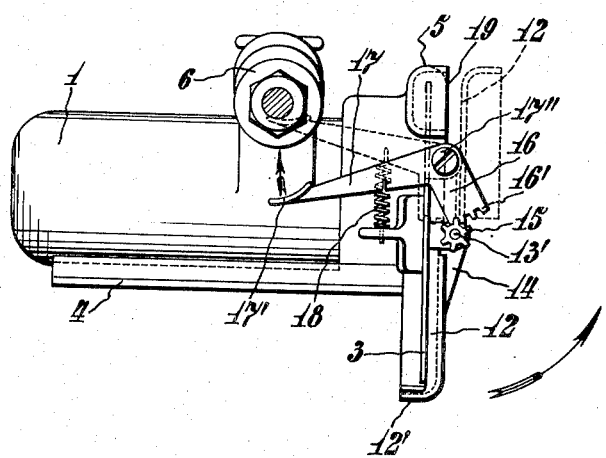
Inventor
Friedrich UTZ
By Fritz C. Herbold
AGENT United States Patent Office 2,801,654
Patented Aug. 6, 1957

2,801,654

GUARD FOR MOTOR-DRIVEN HAND CIRCULAR SAW

Friedrich Utz, Aistaig (Neckar), Germany

Application April 7, 1955, Serial No. 499,968

Claims priority, application Germany April 8, 1954

4 Claims. (Cl. 143—159)

The invention relates to a motor-driven hand circular saw, especially a single-handed circular saw with a protective hood, consisting of a fixed upper part and a pivotable lower part, for the saw blade. In known circular saws of this type, the lower part of the protective hood is pivoted about the spindle of the saw blade into the upper part, before sawing, so that the lower half of the saw blade is free for sawing. The parts of the protective hood, which engage in one another when in the pivoted-in state, can easily jam, especially due to sawdust which has penetrated between the two parts. Therefore after the sawing operation has been terminated the lower part of the protective hood cannot pivot out of the upper part, so that the saw blade remains unprotected. In order to reduce this danger of jamming, a strong spring must be used for the automatic return of the lower part of the protective hood, by which spring the use of the circular saw, especially when it is a matter of a single-handed circular saw, is made more difficult or impossible.

In contrast thereto, the invention consists in that the lower part of the protective hold is pivotable about an axis extending along its upper edge and disposed parallel to the plane of the saw. During sawing the lower part of the protective hood is pivoted out laterally, so that jamming cannot occur at all. The pivoting of the lower part of the protective hood can be effected through a linkage, which is actuated, for example in the case of a single-handed circular saw by the hand grasping around the guide handle of the saw. The lower part of the protective hood is here preferably held in the protective position by a spring acting upon the linkage. This spring need not be strong here, since it is not necessary to expect jamming of the lower part of the protective hood. This circumstance is of especial importance in the case of single-handed circular saws, wherein mostly only one or two fingers are available for the actuation of the protective hood.

Further features of the invention will appear from the following description of an example of embodiment, which refers to the drawing.

Figures 1 and 2 show the lateral and rear elevations respectively of a hand circular saw according to the invention, the splitting wedge not being shown in Figure 2.

The single-handed circular saw illustrated in the drawing consists, in a known manner, of an electric motor 1, upon the shaft 2 of which the circular saw 3 can be mounted directly. The motor 1 is secured on a base-plate 4, which can be placed upon the work-piece. The housing of the motor 1 carires the fixed upper part 5 of the protective hood, and the guide handle 6. A splitting wedge 8 can be adjustably secured on the saw, for example with screws 10 on the base-plate 4 engaging in slots 9. As illustrated in Figure 1, the electrical current supply cable 11 can be conducted through the handle 6.

The lower part 12 of the protective hood is pivotally arranged about an axis 13 extending along its upper edge parallel to the plane of the saw, on the upper part 5 of the protective hood, which is preferably made annular. So that the saw may have as little weight as possible, the lower part 12 of the protective hood can be made annular, when it reaches beneath the teeth of the circular saw blade 3, with its inwardly bent edge 12'. This edge 12' can be interrupted at the point where the splitting wedge 8 is brought up close to the saw blade 3. Since here the teeth of the saw blade are covered by the splitting wedge, the protection is not thereby impaired.

The articulated connection of the lower part 12 of the protective hood with the upper part 5 thereof can consist of two hinge-like articulations. These articulations are formed by bearing eyes 5' and 12" of the two parts 5 and 12 of the protective hood, in which eyes the pins 13' and 13" forming the axis of rotation engage. For the purpose of reinforcement of the lower part 12 of the protective hood ribs 14 disposed perpendicularly of the eyes 12" can here be provided.

One pin 13' is firmly connected with the sleeve 12" of the lower part of the protective hood, which is associated with it, and carries on its end projecting externally out of the sleeve 5' of the upper part 5 of the protective hood, a pinion 15. The teeth of a toothed segment 16' engage in the teeth of this pinion. This toothed segment 16' is situated on one limb 16 of a bell-crank lever 16, 17, the other limb of which 17, has a handle 17' disposed approximately parallel to the guide handle 6. The bell-crank lever 16, 17 is pivotally secured on the upper part 5 of the protective hood, by means of a screw 17". A helical spring 18 engages on the limb 17 of the bell-crank lever 16, 17, the other end of which spring is secured on the saw housing. The spring 18 holds the bell-crank lever in the position shown in full lines in Figure 2, wherein the lower part 12 of the protective hood is situated in the protecting position.

The upper part 5 of the protective hood, which is preferably U-shaped in cross-section, can have in its upper part a tubular, lateral, outlet aperture 19 for saw-dust, whereby hinderance of the saw blade 3 by saw-dust which has penetrated into the upper part 5 of the protective hood is prevented.

When the saw is in use, the index finger of the hand grasping the guide handle 6 grips around the handle 17' and presses it against the guide handle 6. The bell-crank lever 16, 17 then pivots, against the force of the spring 18 in Figure 2, in a clock-wise direction, so that the pinion 15 is rotated in the opposite direction. Thereby the lower part 12 of the protective hood, which is rigidly connected with the pinion 15 through the pin 13' is pivoted into the position illustrated in chain lines in Figure 2, so that the lower part of the saw blade 3 is exposed. In order to pivot back the lower part 12 of the protective hood into its protective position extending beneath the teeth of the circular saw blade, it is only necessary to release the handle 17'. Due to the contracting spring 18 the bell-crank lever 16, 17, and thus, through the pinion 15, also the lower part 12 of the protective hood, is pivoted back again into its protective position, and is held in this position by the force of the spring.

I claim:

1. A single-handle circular power saw comprising a housing, a circular saw blade, a guard comprising an upper stationary member and a lower member rotatable about a pivot axis extending along the upper edge of said lower member and parallel to the plane of the saw, a pinion secured to said lower guard member, a bell-crank lever pivotally mounted on said housing, a handle on one arm of said lever, and a toothed segment secured to the other arm of said lever and engaging said pinion.

2. Motor-driven hand circular saw according to claim 1 wherein the pinion is secured upon the pivot axis firmly connected with the lower member of the protective guard.

3. Motor-driven hand circular saw according to claim 1, wherein a helical spring secured to one end on the saw housing acts with its other end on one arm of the bellcrank lever to urge said lower member toward saw guarding position.

4. Motor-driven hand circular saw according to claim 1, having an annular lower protective guard part, which extends beneath the teeth of the circular saw blade with its inwardly bent edge when in guarding position.

References Cited in the file of this patent

UNITED STATES PATENTS

| | | |
|---|---|---|
| 1,270,430 | Martin | June 25, 1918 |
| 1,738,896 | Hansen | Dec. 10, 1929 |
| 2,342,052 | Jimerson et al. | Feb. 15, 1944 |